US008602656B2

United States Patent
Mashino et al.

(10) Patent No.: US 8,602,656 B2
(45) Date of Patent: Dec. 10, 2013

(54) ALTERNATOR FOR AUTOMOBILE HAVING WASHER BETWEEN HOUSING AND OUTER RACE OF BEARING

(75) Inventors: Mikio Mashino, Kariya (JP); Hiroshi Hamada, Anjo (JP)

(73) Assignee: Denso Corporation, Kariya (JP)

( * ) Notice: Subject to any disclaimer, the term of this patent is extended or adjusted under 35 U.S.C. 154(b) by 250 days.

(21) Appl. No.: 13/174,187

(22) Filed: Jun. 30, 2011

(65) Prior Publication Data

US 2012/0045158 A1 Feb. 23, 2012

(30) Foreign Application Priority Data

Aug. 18, 2010 (JP) ................................ 2010-183079

(51) Int. Cl.
*F16C 19/06* (2006.01)
*F16F 1/34* (2006.01)

(52) U.S. Cl.
USPC .......................................... 384/517; 267/161

(58) Field of Classification Search
USPC ................... 384/517, 518, 563; 267/161–165
See application file for complete search history.

(56) References Cited

U.S. PATENT DOCUMENTS

| | | | | |
|---|---|---|---|---|
| 1,323,188 A | * | 11/1919 | Humphris | 411/164 |
| 2,188,251 A | * | 1/1940 | Nelson | 384/517 |
| 4,645,361 A | * | 2/1987 | Lakin | 384/441 |
| 5,624,193 A | * | 4/1997 | Vogelsberger et al. | 384/517 |
| 2004/0228559 A1 | * | 11/2004 | Horng et al. | 384/517 |
| 2005/0168085 A1 | | 8/2005 | Ihata et al. | |

FOREIGN PATENT DOCUMENTS

| | | | |
|---|---|---|---|
| DE | 9301334 U | * | 4/1993 |
| JP | U-60-128458 | | 8/1985 |
| JP | U-61-176953 | | 11/1986 |
| JP | A-03-212140 | | 9/1991 |
| JP | B2-05-46182 | | 7/1993 |
| JP | U-06-062765 | | 9/1994 |
| JP | A-2003-074549 | | 3/2003 |
| JP | A-2005-218235 | | 8/2005 |

OTHER PUBLICATIONS

Office Action issued in Japanese Patent Application No. 2010-183079 dated May 29, 2012 (with translation).

* cited by examiner

*Primary Examiner* — Thomas R Hannon
(74) *Attorney, Agent, or Firm* — Oliff & Berridge, PLC

(57) ABSTRACT

An alternator has front and rear bearings, supported by front and rear frames, to rotatably support a shaft of a rotor extending along axial direction. A washer is located between the rear frame and the rear bearing to apply pressing force to the rear bearing slightly movable along axial direction. The washer has a ring-shaped base portion concentrically located with the rear bearing, slanting portions extending from the base portion toward outside of radial direction such that two adjacent slanting portions arranged as each pair along circumferential direction are inclined to different sides of axial direction, and flattened portions extending from respective slanting portions toward outside and being parallel to the base portion. Flattened portions shifted to front side are in contact with the rear bearing, and flattened portions shifted to rear side are in contact with the rear frame.

2 Claims, 5 Drawing Sheets

ALTERNATOR FOR AUTOMOBILE HAVING WASHER BETWEEN HOUSING AND OUTER RACE OF BEARING

CROSS-REFERENCE TO RELATED APPLICATION

This application is based upon and claims the benefit of priority of the prior Japanese Patent Application 2010-183079 filed on Aug. 18, 2010, so that the contents of which are incorporated herein by reference.

BACKGROUND OF THE INVENTION

1. Field of the Invention

The present invention relates generally to an alternator mounted on an engine of an automobile such as a truck, and more particularly to the alternator in which bearing units of a rotational shaft have improved vibration proofing while creep caused in bearings of the units is suppressed.

2. Description of Related Art

An alternator attached to an engine of an automobile so as to be driven by the engine has a housing which is composed of a front frame and a rear frame. Each frame is formed in a cup shape, open spaces of the frames are faced each other, and the frames are attached to each other through a stator formed in a cylindrical shape so as to fixedly hold the stator between the frames. A rotor is disposed in the inside space of the stator. A cylindrical front bearing box (hereinafter, called a front box) having a front bearing is provided in the center hole of the front frame, and a cylindrical rear bearing box (hereinafter, called a rear box) having a rear bearing is provided in the center hole of the rear frame. The bearings of the boxes rotatably hold a rotational shaft of the rotor extending along the axial direction of the alternator. The front portion of this shaft is protruded from the front frame, and the shaft is rotated by the engine through a pulley attached to the front end of the shaft.

The outer race of the front bearing is fixed to the front box, while the outer race of the rear bearing is held in the rear box so as to be movable along the axial direction. More specifically, the rear box has a tubular rear bearing holder. This bearing holder is fixed to a side wall of the rear frame located on the rear side of the rear frame, and the bearing holder and the side wall of the rear frame form a bearing receiving portion. Therefore, the rear bearing is held in the bearing receiving portion so as to be slightly movable along the axial direction. Further, a biasing member is provided in the bearing receiving portion so as to push the outer race of the rear bearing toward the front side of the axial direction. Therefore, this biasing member applies a predetermined pressing force directed in the axial direction to the outer race of the rear bearing to prevent the rear bearing from being moved along the axial direction.

It is well known that a washer is used as the biasing member. This washer is located in a space between the rear bearing and an inner side surface (i.e., a side wall surface) of the side wall of the rear frame. This inner side surface also acts as an inner side surface of the side wall of the rear box. The washer is held so as to be in contact with both the outer race of the rear bearing and the inner side surface of the side wall of the rear frame.

To form this washer, a planar spring material is blanked out to obtain a ring-shaped portion, and this ring-shaped portion is bent so as to be formed in a wave shape along the circumferential direction of the ring-shaped portion. For example, a single layer wave washer having no open space along the circumferential direction is obtained. Further, a single layer wave washer having an open space along the circumferential direction is also known. This washer is formed by bending a planar spring material, formed in a long and narrow shape, in a C shape without connecting the ends of the material so as to form only a single layer and reshaping this spring material, formed in the C shape, in a wave shape along the circumferential direction.

Further, Published Japanese Patent First Publication No. 2005-218235 discloses a multi-layered wave washer having an open space along the circumferential direction. This multi-layered wave washer is obtained by repeatedly winding a planar spring material, formed in a long and narrow shape, in circles without connecting the ends of spring material and deforming the wound spring material having many layers in a wave shape. As compared with the single layer wave washer, the multi-layered wave washer integrally formed improves the creep resistance of the bearing and induces the pressing force applied to the outer race of the rear bearing to be easily set within an allowable range.

In each of the single layer wave washer having an open space and the multi-layered wave washer having an open space, the washer body has end portions at different positions in the direction perpendicular to the plane formed by the washer body. When the washer is deformed to be flattened, the end portions are located on the same plane. To prevent the end portions from overlapping with each other, it is required to space the end portions by 2 or 3 mm on the same plane from each other.

However, this space between the end portions easily causes the intertwinement of washers during the thermal treatment and surface finishing performed after the shaping of the washers in mass production. Particularly, as the number of washers intertwining one another is increased, the step for separating the washers from one another is complicated, and it is sometimes required to manually separate the intertwining washers from one another. In this case, the number of steps for producing each washer is extraordinarily increased.

Further, in case of the single layer wave washer having no open space along the circumferential direction, spring characteristics such as a spring constant are rapidly changed with the deformation of the washer, so that the washer located between the rear bearing and the inner side surface of the side wall of the rear frame cannot stably apply a pressing force to the outer race of the rear bearing.

SUMMARY OF THE INVENTION

An object of the present invention is to provide, with due consideration to the drawbacks of the conventional, a generator of an automobile in which a washer is easily produced and stably applies a pressing force to an outer race of a front or rear bearing supported by a housing while being movable along an axial direction of a rotor.

According to a first aspect of this invention, the object is achieved by the provision of an alternator having a front bearing with an outer race, a rear bearing with an outer race, a housing holding the front and rear bearings, a stator located in the housing, a rotor with a shaft located in a space formed on an inside of the stator, and a washer. The shaft extending along an axial direction is rotatably supported by the front bearing and the rear bearing. The washer applies a pressing force to both the housing located on a first axial side of the washer in the axial direction and the outer race of a force receiving bearing, denoting the front or rear bearing, located on a second axial side of the washer opposite to the first axial side. The washer has a ring-shaped base portion concentrically located with the force receiving bearing, and at least three spring portions extending from the base portion along a circumferential direction of the base portion. At least one of the spring portions or the base portion is in contact with the outer race of the force receiving bearing so as to apply the pressing force to the outer race, while at least another one of the spring portions or the base portion not in contact with the outer race is in contact with the housing so as to apply the pressing force to the housing.

With this structure of the alternator, when the shaft of the rotor is rotated in response to a rotational force applied from an engine, electric power is induced in the stator. Further, the washer applies the pressing force to the outer race of the force receiving bearing to prevent the force receiving bearing from being moved along the axial direction.

The washer has the base portion closed along the circumferential direction. Therefore, even when washers are intertwined during the thermal treatment and surface finishing for the washers in mass production, the intertwinement of the washers is not complicated, but the washers can be easily separated from one another. Accordingly, the washer can be easily produced.

Moreover, because the spring portions are separately located in the washer, spring constants of the spring portions can be independently set such that the washer appropriately applies the pressing force to the outer race of the force receiving bearing. Further, because the washer has many spring portions, the spring constant of each spring portion can be set at a comparatively low value, and the total spring constant of the washer can be maintained at a constant value in the wide range of the displacement of the spring portions deformed along the axial direction. Accordingly, the washer can stably apply the pressing force to the force receiving bearing.

DETAILED DESCRIPTION OF THE PREFERRED EMBODIMENTS

Figure 1:
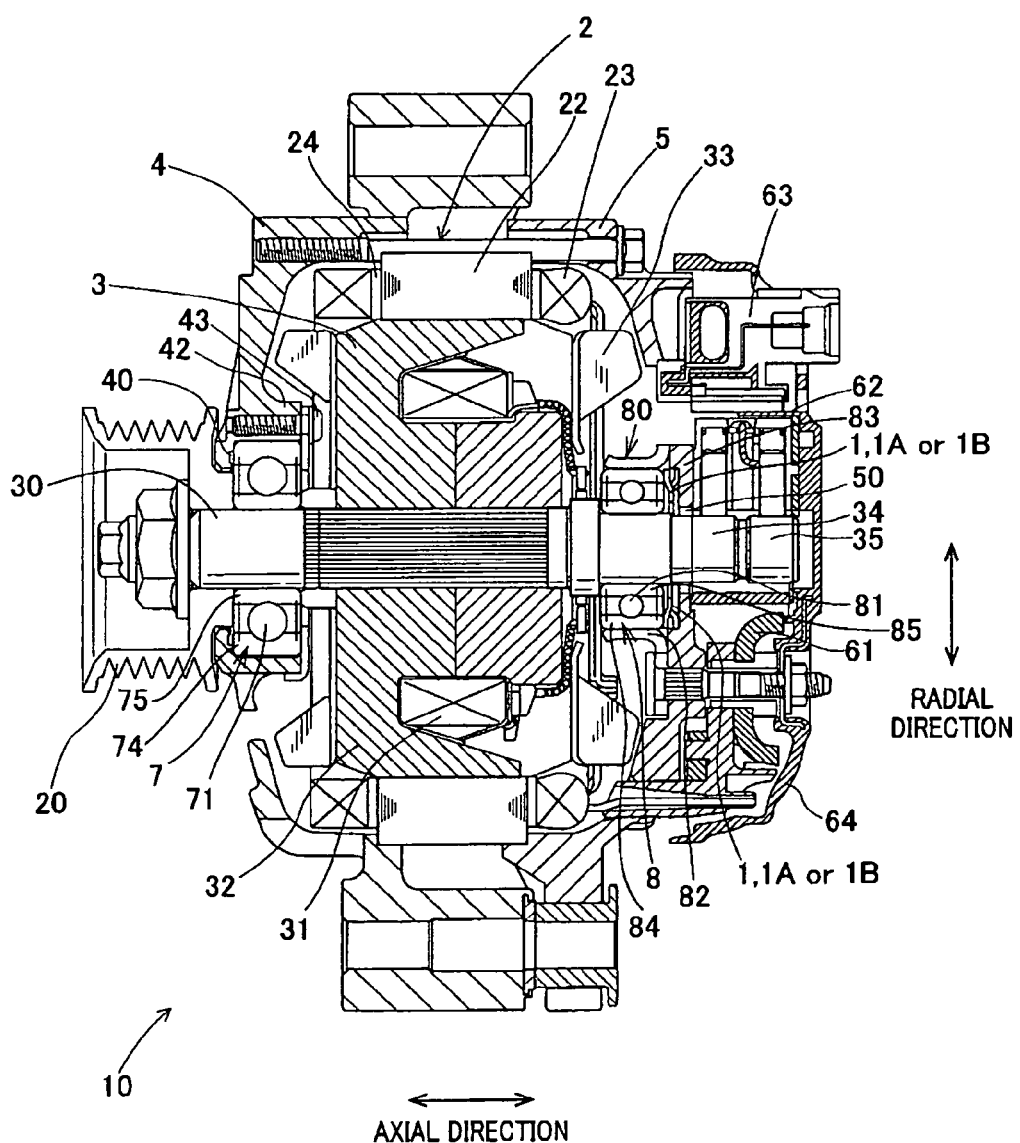
FIG. 1 is a view, partially in cross section, showing the structure of an alternator of an automobile according to embodiments of the present invention.

Embodiments of the present invention will be described with reference to the accompanying drawings, in which like reference numerals indicate like parts, members or elements throughout the specification unless otherwise indicated.
First Embodiment FIG. 1 is a view, partially in cross section, showing the structure of an alternator 10 of an automobile according to the first embodiment. The alternator 10 is driven by a rotational torque, generated in an engine of the automobile and transmitted through a belt, to charge an accumulator battery mounted on the automobile and to supply electric power to electric consumers mounted on the automobile.

As shown in FIG. 1, the alternator 10 has a stator 2 formed in a cylindrical shape, a rotor 3, and a housing composed of a drive end frame (hereinafter, called a front frame) 4 and a rear end frame (hereinafter, called a rear frame) 5. Each of the frames 4 and 5 is made of aluminium alloy and is formed in a cup shape. The frames 4 and 5 are attached to each other through the stator 2 such that open spaces of the frames face each other. A rectifier 61, a brush apparatus 62 and a voltage adjusting apparatus 63 are located on the rear side of a rear side wall of the frame 5 and are covered with a rear end cover 64 fixedly attached to the rear frame 5. The rectifier 61 converts a three-phase alternating current generated in the alternator 10 to a direct current.

The stator 2 has a stator core 22, a three-phase stator winding 23, and an insulator 24 insulating the core 22 and the winding 23 from each other. The stator core 22 is fixedly located between an open end portion of a circumferential wall of the frame 4 and an open end portion of a circumferential wall of the frame 5. The open end portions of the frames 4 and 5 are fixedly attached to each other by bolts so as to place the core 22 between the end portions. The rotor 3 is located in an open area of the cylindrical stator 2 through a predetermined space. The frame 4 has a shaft hole 40 in the center of a front side wall of the frame 4. The frame 5 has a shaft hole 50 in the center of the rear side wall. The rotor 3 has a rotational shaft 30 formed in a columnar shape. This shaft 30 extends along the axial direction of the alternator 10 and passes through the holes 40 and 50 so as to penetrate through the frames 4 and 5. Each of the frames 4 and 5 has many windows through which cooling air is taken into the open space of the frames and is discharged from the open space to the outside.

A front bearing box (hereinafter, called a front box) 7 formed in a cylindrical shape is located in the hole 40 of the side wall of the frame 4 so as to protrude toward the inside of the frame 4 along the axial direction. A rear bearing box (hereinafter, called a rear box) 8 formed in a cylindrical shape is located in the hole 50 of the side wall of the frame 5 so as to protrude toward the inside of the frame 5 along the axial direction. A front bearing 71 having an outer race 74 and an inner race 75 is attached to the front box 7 so as to fix the outer race 74 of the bearing 71 to the front box 7. A rear bearing 81 having an outer race 84 and an inner race 85 is attached to the rear box 8 such that the outer race 84 of the bearing 81 is movable along the axial direction. The front box 7 has a tube portion 42, located in the center of the frame 4, and a fastening ring 43 for fastening the rear end surface (i.e., the inner end surface) of the tube portion 42 to the frame 4. Therefore, the frame 4 can hold the front bearing 71 attached to the front box 7. The shaft 30 passes through the inside of the tube portion 42.

A rear bearing holder 80 is located in the rear box 8 to hold the rear bearing 81. The holder 80 has a tube body and a flange 82 extending from the rear end of the tube body. The flange 82 is attached to the side wall of the rear frame 5. Therefore, the frame 5 can hold the rear bearing 81 held by the holder 80. The front surface of the side wall of the frame 5 surrounding the shaft hole 50 is reshaped by spot facing so as to form a side wall surface 83. The rear box 8 is formed by the holder 80 and the side wall surface 83 of the frame 5. Therefore, the side wall of the rear box 8 is made of the aluminium alloy of the frame 5.

The front and rear portions of the shaft 30 are rotatably supported by the front and rear bearings 71 and 81, respectively. A pulley 20 is attached to the front end portion of the shaft 30 protruded from the frame 4. The pulley 20 is connected with a belt (not shown) so as to receive a rotational torque from an engine (not shown) through the belt.

The rotor 3 has a magnetic field winding 31, a front pole core 32 and a rear pole core 32. The winding 31 is formed by winding a copper wire covered with insulation layer cylindrically and concentrically. Each core 32 has six claw poles. The cores 32 are attached to each other around the shaft 30 so as to alternately place the claw poles of the front pole core 32 and the claw poles of the rear pole core 32 along the circumferential direction of the alternator 10 and to place the winding 31 between the cores 32. Front cooling fans 33 are attached to the front surface of the front pole core 32 to take cooling air in the open space formed in the inside of the frames 4 and 5, and rear cooling fans 33 are attached to the rear surface of the rear pole core 32 by welding to discharge the cooling air along the axial direction and the radial direction of the alternator 10. Two slip rings 34 and 35 are attached to the rear end portion of the shaft 30 so as to be electrically connected with the respective ends of the winding 31. Exciting current is supplied from the brush apparatus 62 to the winding 31 through the slip rings 34 and 35.

The alternator 10 is driven by the engine through the pulley 20. More specifically, when the alternator 10 receives the rotational force from the engine through the belt and pulley 20, the rotor 3 is rotated in a predetermined direction. When exciting voltage is applied from the outside to the winding 31 of the rotor 3, the claw poles of the cores 32 are magnetized, and a three-phase alternating current voltage is induced in the winding 23. Then, this alternating current is rectified to direct current in the rectifier 61, and electric power of the direct current is outputted from an output terminal of the rectifier 61.

Although the bearings 71 and 81 support the shaft 30 of the rotor 3 to suppress the movement of the shaft 30 in the radial direction, the shaft 30 is slightly movable along the axial direction. Therefore, the shaft 30 easily moves or vibrates along the axial direction. Therefore, to prevent the shaft 30 from being moved along the axial direction, a biasing member applies a pressing force directed in the axial direction to the outer race 84 of the rear bearing 81 to apply the pressing force to the shaft 30 through the outer race 40.

Figure 2:
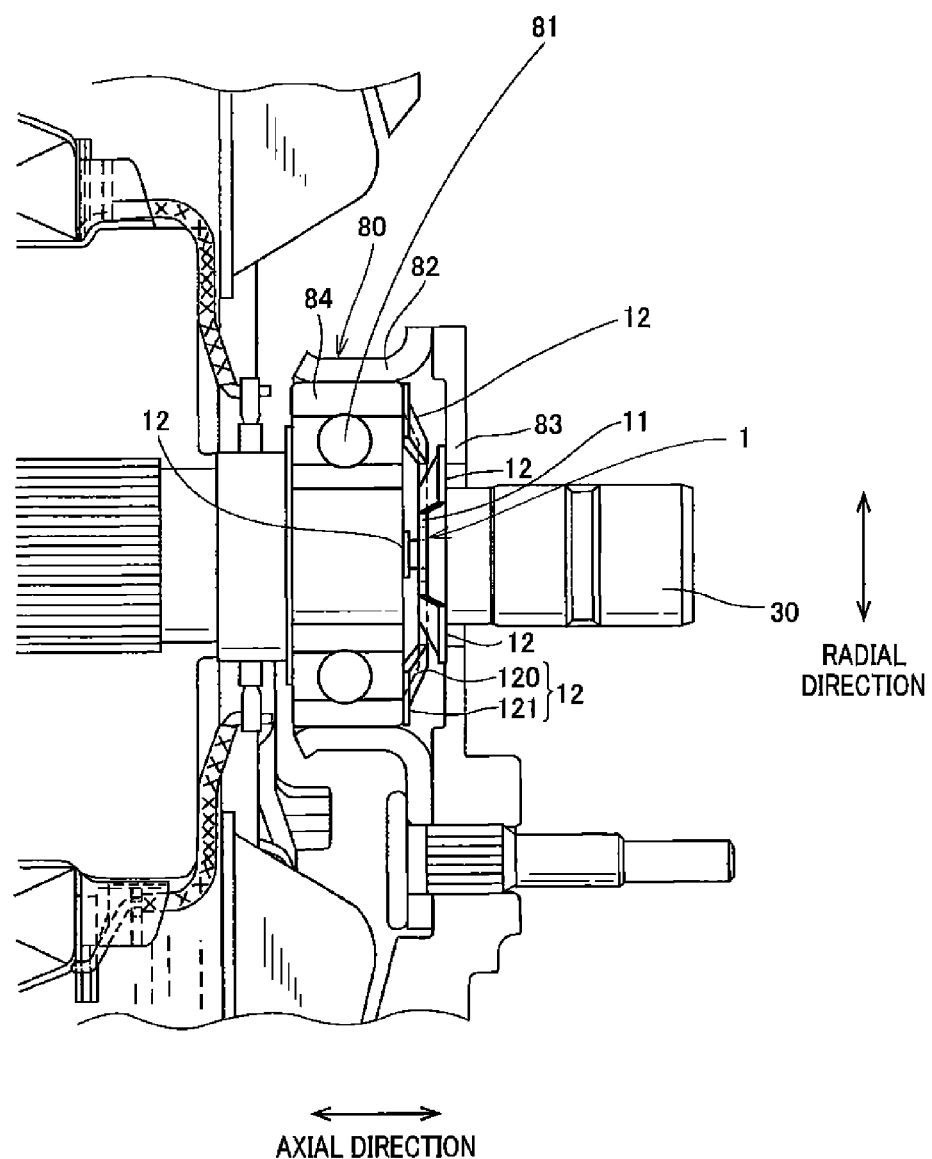
FIG. 2 is an enlarged view of a rear portion of the alternator shown in FIG. 1.

FIG. 2 is an enlarged view of a rear portion of the alternator 10. As shown in FIG. 2, a washer 1 integrally formed almost in a ring shape is located as the biasing member in a space between the rear frame 5, located on the rear side (i.e., first axial side) of the washer 1 in the axial direction, and the rear bearing 81, located on the front side (i.e., second axial side) of the washer 1 opposite to the front side, so as to be in contact with both the outer race 84 of the bearing 81 and the side wall surface 83 of the rear frame 5. The washer 1 applies a pressing force to both the outer race 84 and the side wall surface 83.

Figure 3A:
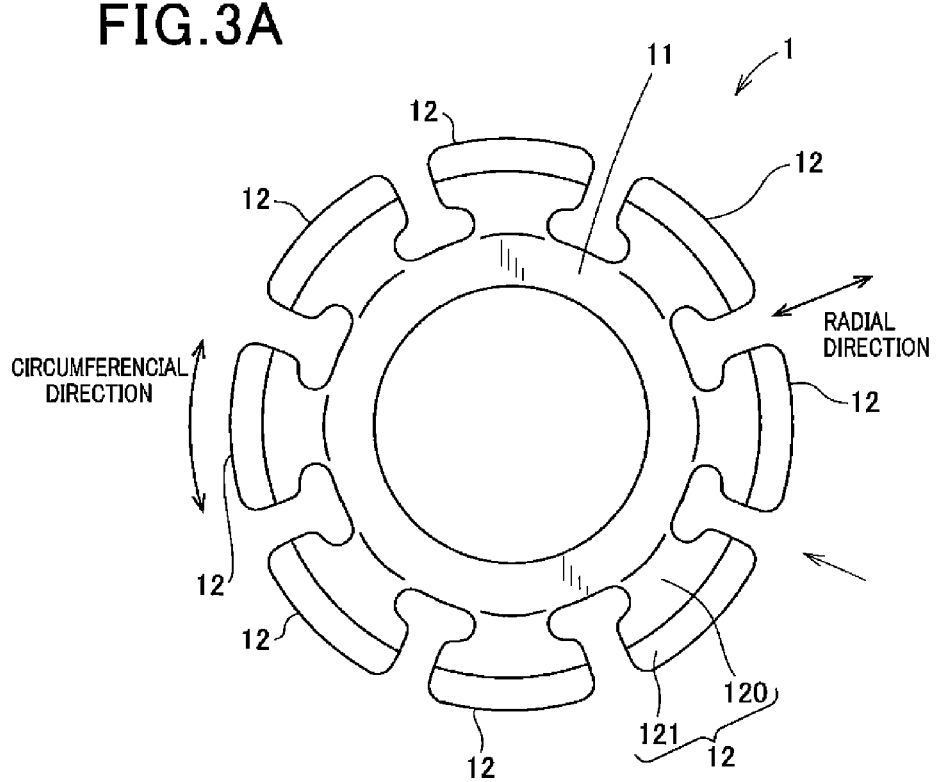
FIG. 3A is a front view of a washer of the alternator shown in FIG. 1 according to the first embodiment.
Figure 3B:
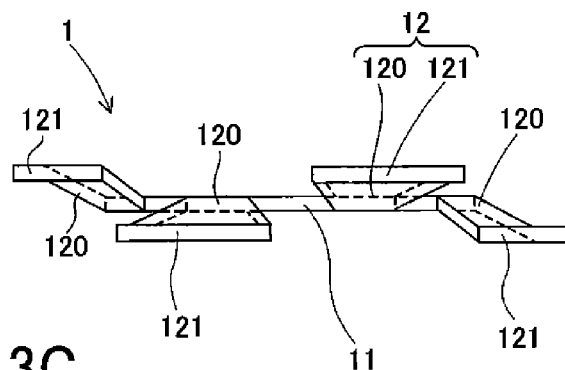
FIG. 3B is a side view of the washer seen from a direction of an arrow shown in FIG. 3A.

FIG. 3A is a front view of the washer 1 according to the first embodiment, while FIG. 3B is a side view of the washer 1 seen from a direction of an arrow shown in FIG. 3A. As shown in FIG. 3A and FIG. 3B, the washer 1 has a ring-shaped base portion 11 and a plurality of spring portions 12 extending from the outer circumferential end of the base portion 11 toward the outside along the radial direction of the base portion 11. The base portion 11 is formed flatly so as to be closed along the circumferential direction of the base portion 11. The washer 1 has at least three spring portions 12 separated from one another. For example, the washer 1 has eight spring portions 12 arranged at equal intervals along the circumferential direction. The width of each spring portion 12 along the circumferential direction is widened toward the outside of the radial direction, so that the space between two spring portions 12 adjacent to each other as each pair is almost constant along the radial direction.

Each spring portion 12 is composed of a slanting portion 120, extending from the outer circumferential end of the base portion 11 toward the outside, and a flattened portion 121 extending from the outer circumferential end of the slanting portion 120. Each slanting portion 120 is inclined to the first side of the thickness direction of the base portion 11 or the second side opposite to the first side by an angle smaller than 90 degrees such that two spring portions 12 adjacent to each other as each pair along the circumferential direction extends toward the different sides. That is, the boundary portion between each slanting portion 120 and the base portion 11 is bent toward the first or second side. Therefore, the spring portions 12 inclined to the first side and the spring portions 12 inclined to the second side are alternately arranged along the circumferential direction. Each flattened portion 121 extends to be parallel to the base portion 11. That is, the boundary portion between each flattened portion 121 and the corresponding slanting portion 120 is bent toward the first or second side.

The base portion 11 has a circular hole of which the diameter is almost equal to the diameter of the shaft 30. The shaft 30 is located in the circular hole of the base portion 11 to attach the washer 1 to the shaft 30 (refer to FIG. 1 and FIG. 2). That is, the washer 1, the bearing 81 and the shaft 30 are concentrically arranged in the alternator 10, and the thickness direction of the base portion 11 accords with the axial direction of the alternator 10. Further, the distance from the center of the base portion 11 to each flattened portion 121 is set to be almost equal to the distance from the center axis of the shaft 30 to the outer race 84 of the rear bearing 81. Moreover, the outer diameter of the side wall surface 83 of the rear frame 5 is set to be equal to or slightly larger than the outer diameter of the washer 1. The flattened portions 121 shifted from the base portion 11 toward the rear side (i.e., the flattened portions 121 extending from the slanting portion 120 inclined to the first side) are in contact with the side wall surface 83 of the frame 5, while the flattened portions 121 shifted from the base portion 11 toward the front side (i.e., the flattened portions 121 extending from the slanting portion 120 inclined to the second side) are in contact with the outer race 84 of the bearing 81 so as to apply a pressing force to the outer race 84.

The washer 1 is formed by blanking out a planar spring material so as to form a unit of the base portion 11 and the spring portions 12 not bent, bending each slanting portion 120 toward the first or second side and bending each flattened portion 121 toward the first or second side. Then, the shaft 30 is inserted into the circular hole of the base portion 11.

With this structure of the alternator 10, when the alternator 10 is driven, the washer 1 applies a pressing force to the shaft 30 through the outer race 84 of the bearing 81 along the axial direction while each of the spring portions 12 of the washer 1 is elastically deformed at a spring constant (i.e., a spring characteristic). This spring constant is adjusted by adjusting the width of each spring portion 12.

Accordingly, the washer 1 can stably apply a pressing force to both the outer race 84 of the rear bearing 81 and the rear frame 5 so as to prevent the shaft 30 from being moved or along the axial direction.

Further, the washer 1 has the base portion 11 closed along the circumferential direction and the spring portions 12 located on the outer circumferential side of the base portion 11. Therefore, even when washers 1 are intertwined during the thermal treatment and surface finishing for the washers 1, the intertwinement of the washers 1 is not complicated, but the washers 1 can be easily separated from one another. For example, one or two spring portions 12 of one washer 1 merely enters into the center hole of the base portion 11 of another washer 1, or one spring portions 12 of one washer 1 merely enters into the open space between two spring portions 12 of another washer 1. These intertwined washers 1 can be easily separated from each other.

Moreover, because the spring portions 12 are separately located in the washer 1, spring constants of the spring portions 12 can be independently set such that the washer 1 appropriately applies the pressing force to the outer race 84 of the bearing 81. For example, the width of each spring portion 12 (especially, each slanting portion 120) is appropriately set to adjust the spring constant of the spring portion 12. Further, because the washer 1 has many spring portions 12, the spring constant of each spring portion 12 can be set at a comparatively low value, and the total spring constant of the washer 1 can be maintained at a constant value in the wide range of the displacement of the spring portions 12 deformed along the axial direction. Accordingly, the washer 1 can stably apply the pressing force to the outer race 84 of the rear bearing 81.

Furthermore, because the portions 121 of the washer 1 being in contact with the side wall surface 83 are flattened on the side wall surface 83, the washer 1 can uniformly press the side wall surface 83. Therefore, the side wall surface 83 made of aluminium alloy is hardly worn away by the washer 1. Accordingly, the washer 1 can effectively prevent the side wall surface 83 from being worn away. Further, because the side wall surface 83 is hardly worn away, the pressing force of the washer 1 can be effectively maintained at a predetermined setting load even when the alternator 10 is driven for a long time.

Still further, even when a large sized alternator 10 is manufactured so as to increase the weight of the rotor 3, the washer 1 appropriately applying the pressing force to the bearing 81 can heighten the creep resistance of the bearing 81 and can reliably press the bearing 81 at a pressing force within an allowable range of the bearing 81. Accordingly, even when the alternator 10 is driven for a long time, the washer 1 can prevent the bearing 81 from being burned or causing a breakage.

Still further, because the washer 1 is formed by blanking out a planar spring material, the washer 1 can be easily produced as compared with a washer which is formed by bending a planar spring material having a long and narrow shape in a C shape.

In this embodiment, because the outer race 84 of the bearing 81 is movable along the axial direction, the washer 1 is located to be in contact with both the outer race 84 of the bearing 81 and the side wall surface 83. However, when the outer race 74 of the front bearing 71 is movable along the axial direction while the outer race 84 of the bearing 81 is fixed in the axial direction, the washer 1 may be located to be in contact with both the outer race 74 of the front bearing 71 and a side wall surface of the front frame 4.

Further, in this embodiment, the spring portions 12 inclined to the first side and the spring portions 12 inclined to the second side are alternately arranged along the circumferential direction. However, the inclination direction of the spring portions 12 may be differentiated every two spring portions 12 or more along the circumferential direction.

Figure 3C:
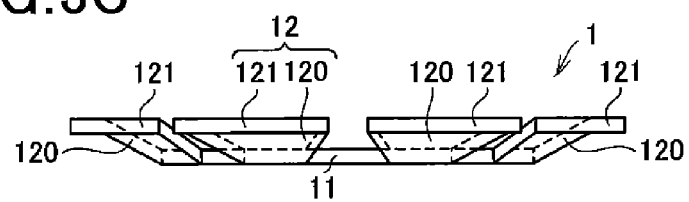
FIG. 3C is a side view of another washer seen from a direction of an arrow shown in FIG. 3A according to a modification of the first embodiment.

Moreover, as shown in FIG. 3C, all the spring portions 12 of the washer 1 may be inclined to the same side of the thickness direction (i.e., the axial direction). In this case, all the flattened portions 121 are in contact with the outer race 84 of the bearing 81, while the whole base portion 11 is in contact with the side wall surface 83 of the frame 5. Because the whole base portion 11 is uniformly in contact with the side wall surface 83 of the frame 5, the washer 1 can further prevent the side wall surface 83 from being worn away, and the pressing force of the washer 1 can be further effectively maintained even when the alternator 10 is driven for a long-time. Alternatively, the whole base portion 11 is in contact with the outer race 84 of the bearing 81, while all the flattened portions 121 are in contact with the side wall surface 83 of the frame 5. Because the whole base portion 11 is in contact with the outer race 84 of the bearing 81, the washer 1 can prevent the outer race 84 from being worn away, and the pressing force of the washer 1 can be further effectively maintained even when the alternator 10 is driven for a long time.

Second Embodiment

In this embodiment, a washer 1A integrally formed almost in a double-ring shape is located as the biasing member in a space between the rear bearing 81 and the side wall surface 83 of the rear frame 5 so as to be in contact with both the outer race 84 of the bearing 81 and the side wall surface 83.

Figure 4A:
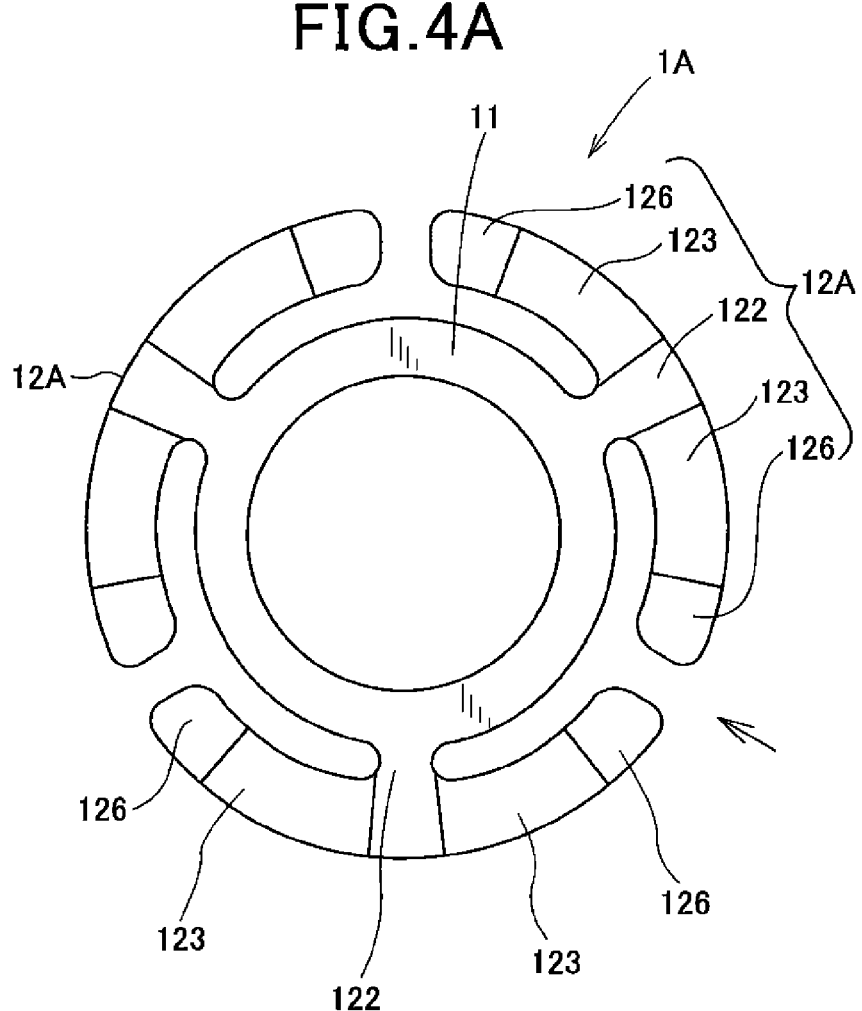
FIG. 4A is a front view of a washer of the alternator shown in FIG. 1 according to the second embodiment.
Figure 4B:
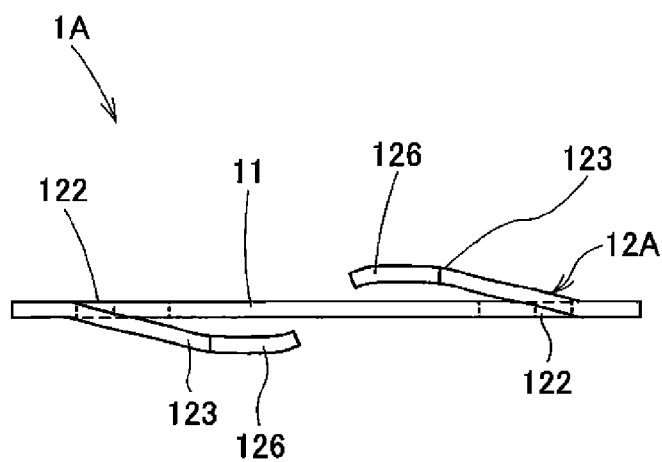
FIG. 4B is a side view of the washer seen from a direction of an arrow shown in FIG. 4A.

FIG. 4A is a front view of the washer 1A according to the second embodiment, while FIG. 4B is a side view of the washer 1A seen from a direction of an arrow shown in FIG. 4A. As shown in FIG. 4A and FIG. 4B, the washer 1A has the base portion 11 formed flatly and a plurality of spring portions 12A extending from the outer circumferential end of the base portion 11 toward the outside along the radial direction of the base portion 11. The washer 1A has at least three spring portions 12A separately located. For example, the washer 1A has three spring portions 12A arranged at equal intervals along the circumferential direction.

Each spring portion 12A is composed of a connection portion 122 extending from the outer circumferential end of the base portion 11, a first slanting portion 123 extending from one outermost side end of the connection portion 122 toward a first circumferential side along the circumferential direction of the base portion 11, a second slanting portion 123 extending from the other outermost side end of the connection portion 122 toward a second circumferential side opposite to the first circumferential side, a first tip portion 126 extending from the end of the first slanting portion 123 toward the first circumferential side so as to face another spring portion 12A, and a second tip portion 126 extending from the end of the second slanting portion 123 toward the second circumferential side so as to face still another spring portion 12A. The spring portion 12A is formed symmetrically with respect to the connection portion 122.

Each connection portion 122 extends on the same plane as the plane of the base portion 11. Therefore, the connection portions 122 and the base portion 11 are flattened. Each of the first slanting portions 123 of the spring portions 12A is inclined to the first thickness side of the thickness direction of the base portion 11 by a predetermined angle smaller than 90 degrees. Each of the second slanting portions 123 of the spring portions 12A is inclined to the second thickness side opposite to the first thickness side by the predetermined angle. That is, the boundary portion between each slanting portion 123 and the corresponding connection portion 122 is bent toward the first or second thickness side. Therefore, the slanting portions 123 inclined to the first thickness side and the slanting portions 123 inclined to the second thickness side are alternately arranged along the circumferential direction. In contrast, each tip portion 126 extends in parallel to the base portion 11. That is, the boundary portion between each tip portion 126 and the corresponding slanting portion 123 is bent toward the first or second thickness side.

The washer 1A is attached to the shaft 30 such that the shaft 30 is located in the circular hole of the base portion 11. That is, the washer 1A, the bearing 81 and the shaft 30 are concentrically arranged in the alternator 10, and the thickness direction of the base portion 11 accords with the axial direction of the alternator 10. Further, the distance from the center of the base portion 11 to each tip portion 126 is set to be almost equal to the distance from the center axis of the shaft 30 to the outer race 84 of the rear bearing 81. Moreover, the outer diameter of the side wall surface 83 of the rear frame 5 is set to be equal to or slightly larger than the outer diameter of the washer 1A. Therefore, the tip portions 126 shifted from the base portion 11 toward the front side of the axial direction are in contact with the outer race 84 of the bearing 81 so as to apply a pressing force to the outer race 84, while the tip portions 126 shifted from the base portion 11 toward the rear side are in contact with the side wall surface 83 of the frame 5 so as to apply a pressing force to the side wall surface 83.

The washer 1A is formed by blanking out a planar spring material so as to form a unit of the base portion 11 and the spring portions 12A not bent, bending each slanting portion 123 toward the first or second side of the thickness direction and bending each tip portion 126 toward the other side of the thickness direction. Then, the shaft 30 is inserted into the circular hole of the base portion 11.

With this structure of the alternator 10, when the alternator 10 is driven, the washer 1A applies a pressing force to the shaft 30 through the outer race 84 of the bearing 81 along the axial direction while each of the spring portions 12A of the washer 1A is elastically deformed at a spring constant (i.e., a spring characteristic). This spring constant is set by adjusting the width of each slanting portion 123 along the radial direction of the base portion 11.

Accordingly, the washer 1A can exert the same effects as those of the washer 1A.

Further, each tip portion 126 can be lengthened along the circumferential direction so as to increase the area of the tip portion 126. Accordingly, even when the alternator 10 is driven for a long time, the washer 1A can prevent the side wall surface 83 of the frame 5 being in contact with the tip portion 126 from being worn away.

Moreover, each spring portion 12A receives an axial-directional reaction from the side wall surface 83 at one tip portion 126 and receives another axial-directional reaction from the outer race 84 of the bearing 81 at the other tip portion 126. Directions of these reactions are opposite to each other. Therefore, axial-directional stress applied to the boundary portion between the spring portion 12A and the base portion 11 can be considerably reduced. Accordingly, the width of each connection portion 122 along the circumferential direction can be shortened so as to lighten the washer 1A in weight.

In this embodiment, because the bearing 81 is movable along the axial direction, the washer 1A is located to be in contact with both the outer race 84 of the bearing 81 and the side wall surface 83. However, when the front bearing 71 is movable along the axial direction while the bearing 81 is fixed in the axial direction, the washer 1A may be located to be in contact with both the outer race 74 of the front bearing 71 and a side wall surface of the front frame 4.

Further, in this embodiment, as shown in FIG. 4B, two slanting portions 123 of two spring portions 12A facing each other through a space as each pair are inclined to different sides of the thickness direction (i.e., the axial direction). However, in the washer 1A having an even-numbered spring portions 12A, two slanting portions 123 of two spring portions 12A facing each other through a space as each pair may be inclined to the same side of the thickness direction (i.e., the axial direction), while two slanting portions 123 of each spring portion 12A are inclined to different sides. In this case, the tip portions 126 of the spring portions 12A shifted from the base portion 11 toward the front side of the axial direction are in contact with the outer race 84 of the bearing 81, while the tip portions 126 of the spring portions 12A shifted from the base portion 11 toward the rear side are in contact with the side wall surface 83 of the frame 5.

Third Embodiment

In this embodiment, a washer 1B integrally formed almost in a double-ring shape is located as the biasing member in a space between the rear bearing 81 and the side wall surface 83 of the rear frame 5 so as to be in contact with both the outer race 84 of the bearing 81 and the side wall surface 83.

Figure 5A:
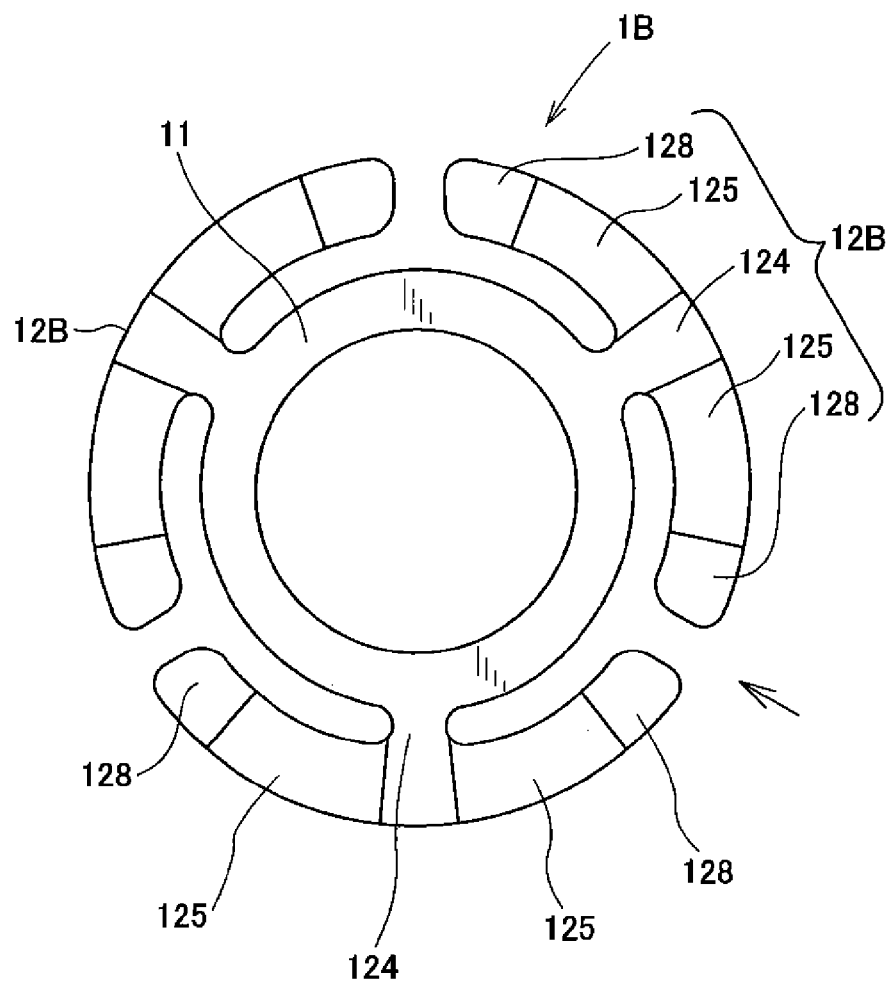
FIG. 5A is a front view of a washer of the alternator shown in FIG. 1 according to the third embodiment.
Figure 5B:
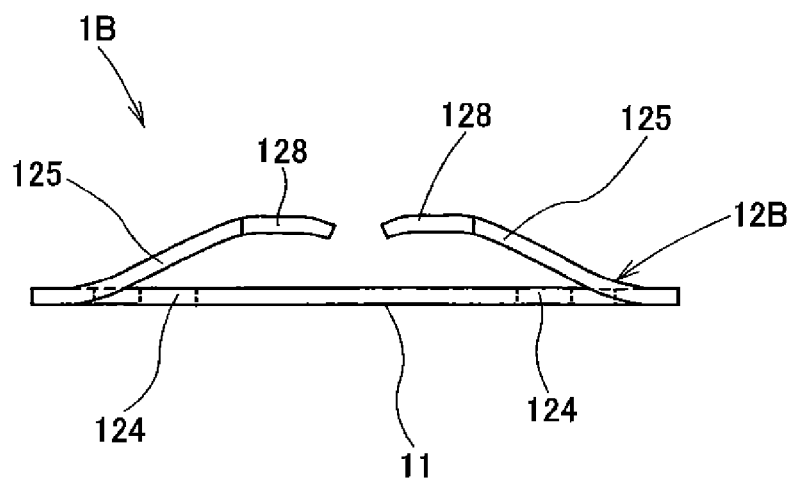
FIG. 5B is a side view of the washer seen from a direction of an arrow shown in FIG. 5A.

FIG. 5A is a front view of the washer 1B according to the third embodiment, while FIG. 5B is a side view of the washer 1B seen from a direction of an arrow shown in FIG. 5A. As shown in FIG. 5A and FIG. 5B, the washer 1B has the ring-shaped base portion 11 and a plurality of spring portions 12B. The shape and size of the washer 1B projected on the plane in which the base portion 11 exists are the same as the projected shape and size of the washer 1A. Each spring portion 12B is composed of a connection portion 124 extending from the base portion 11 in the same plane as that of the base portion 11 in the same manner as the connection portion 122 shown in FIG. 4A, first and second slanting portions 125 extending from the connection portion 124 while being inclined to different sides of the thickness direction in the same manner as the first and second slanting portions 123, and first and second tip portions 128 extending from the respective slanting portions 125 in parallel to the base portion 11 in the same manner as the portions 126 shown in FIG. 4A.

The washer 1B differs from the washer 1A in that all the slanting portions 125 of the spring portions 12B of the washer 1B are inclined to the front side of the axial direction by a predetermined angle smaller than 90 degrees. That is, the boundary portion between each slanting portion 125 and the corresponding connection portion 124 in the washer 1B is bent toward one side of the thickness direction, and the boundary portion between each tip portion 128 and the corresponding slanting portion 125 in the washer 1B is bent toward the other side to set the tip portion 128 in parallel to the base portion 11.

The washer 1B is attached to the shaft 30 such that the shaft 30 is located in the circular hole of the base portion 11. That is, the washer 1B, the bearing 81 and the shaft 30 are concentrically arranged in the alternator 10, and the thickness direction of the base portion 11 accords with the axial direction of the alternator 10. The tip portions 128 shifted from the base portion 11 to the front side of the axial direction are in contact with the outer race 84 of the bearing 81 so as to apply a pressing force to the outer race 84, while the whole base portion 11 is in contact with the side wall surface 83 of the frame 5 so as to apply a pressing force to the side wall surface 83.

The washer 1B is formed by blanking out a planar spring material so as to form a unit of the base portion 11 and the spring portions 12B not bent, bending each slanting portion 125 toward a first side of the thickness direction and bending each tip portion 128 toward a second side opposite to the first side. Then, the shaft 30 is inserted into the circular hole of the base portion 11.

With this structure of the alternator 10, when the alternator 10 is driven, the washer 1B applies a pressing force to the shaft 30 through the outer race 84 of the bearing 81 along the axial direction while each of the spring portions 12B of the washer 1B is elastically deformed at a spring constant (i.e., a spring characteristic). This spring constant is set by adjusting the width of each slanting portion 125 along the radial direction of the base portion 11.

Accordingly, the washer 1B can exert the same effects as those of the washers 1 and 1A.

Further, the whole base portion 11 is in contact with the side wall surface 83 of the frame 5. Accordingly, even when the alternator 10 is driven for a long time, the washer 1B can further prevent the side wall surface 83 from being worn away, and the pressing force of the washer 1B can be further effectively maintained.

In this embodiment, because the outer race 84 of the bearing 81 is movable along the axial direction, the washer 1B is located to be in contact with both the outer race 84 of the bearing 81 and the side wall surface 83. However, when the outer race 74 of the front bearing 71 is movable along the axial direction while the outer race 84 of the bearing 81 is fixed in the axial direction, the washer 1B may be located to be in contact with both the outer race 74 of the front bearing 71 and a side wall surface of the front frame 4.

Further, in this embodiment, all the slanting portions 125 of the washer 1B are inclined to the front side of the axial direction. However, all the slanting portions 125 of the washer 1B may be inclined to the rear side of the axial direction. In this case, all the tip portions 128 of the washer 1B are in contact with the side wall surface 83 of the frame 5, while the whole base portion 11 is in contact with the outer race 84 of the bearing 81. Therefore, even when the alternator 10 is driven for a long time, the washer 1B can prevent the outer race 84 from being worn away, and the pressing force of the washer 1B can be further effectively maintained.

What is claimed is:

1. An alternator, comprising:
a front bearing with an outer race;
a rear bearing with an outer race;
a housing holding the front and rear bearings;
a stator located in the housing;
a rotor with a shaft located in a space formed on an inside of the stator such that the shaft extending along an axial direction is rotatably supported by the front bearing and the rear bearing; and
a washer that applies a pressing force to both the housing located on a first axial side of the washer in the axial direction and the outer race of a force receiving bearing, denoting the front or rear bearing, located on a second axial side of the washer opposite to the first axial side,
wherein the washer comprises:
a ring-shaped base portion concentrically located with the force receiving bearing; and
at least three spring portions extending from an outer circumferential end of the base portion toward an outside of the base portion along a circumferential direction of the base portion such that at least one of the spring portions or the base portion is in contact with the outer race of the force receiving bearing so as to apply the pressing force to the outer race while at least another one of the spring portions or the base portion not in contact with the outer race is in contact with the housing so as to apply the pressing force to the housing, and
each spring portion of the washer comprises:
a slanting portion, extending from the base portion along a radial direction of the base portion while being inclined to the axial direction, and
a flattened portion extending from the slanting portion along the radial direction while being substantially in parallel to the base portion, such that:
two slanting portions adjacent to each other in each pair along the circumferential direction are, respectively, inclined to the first and second axial sides of the axial direction, and
the flattened portions extending from the slanting portions inclined to the first axial side are in contact with the housing, and the flattened portions extending from the slanting portions inclined to the second axial side are in contact with the outer race of the force receiving bearing.

2. An alternator comprising:
a front bearing with an outer race;
a rear bearing with an outer race;
a housing holding the front and rear bearings;
a stator located in the housing;
a rotor with a shaft located in a space formed on an inside of the stator such that the shaft extending along an axial direction is rotatably supported by the front bearing and the rear bearing; and
a washer that applies a pressing force to both the housing located on a first axial side of the washer in the axial direction and the outer race of a force receiving bearing, denoting the front or rear bearing, located on a second axial side of the washer opposite to the first axial side,
wherein the washer comprises:
a ring-shaped base portion concentrically located with the force receiving bearing; and
at least three spring portions extending from an outer circumferential end of the base portion toward an outside of the base portion along a circumferential direction of the base portion such that at least one of the spring portions or the base portion is in contact with the outer race of the force receiving bearing so as to apply the pressing force to the outer race while at least another one of the spring portions or the base portion not in contact with the outer race is in contact with the housing so as to apply the pressing force to the housing, and
each spring portion of the washer comprises:
a connection portion extending from the outer circumferential end of the base portion along a radial direction of the base portion,
a first slanting portion extending from an outermost side of the connection portion toward a first circumferential side of the circumferential direction while being inclined to the first axial side of the axial direction,
a second slanting portion extending from the outermost side of the connection portion toward a second circumferential side opposite to the first circumferential side while being inclined to the second axial side of the axial direction,
a first tip portion extending from the first slanting portion toward the first circumferential side so as to be substantially in parallel to the base portion, and
a second tip portion extending from the second slanting portion toward the second circumferential side so as to be substantially in parallel to the base portion,
such that:
two slanting portions adjacent to each other in each pair along the circumferential direction are, respectively, inclined to the first and second axial sides of the axial direction, and
the first tip portions of the washer are in contact with the housing, while the second tip portions of the washer are in contact with the outer race of the force receiving bearing.

\* \* \* \* \*